(12) United States Patent
Anderson

(10) Patent No.: US 11,534,800 B1
(45) Date of Patent: Dec. 27, 2022

(54) ATTACHMENT FOR USE WITH LINEAR SHAKER TYPE CONVEYOR

(71) Applicant: Joseph M. Anderson, Sanborn, NY (US)

(72) Inventor: Joseph M. Anderson, Sanborn, NY (US)

( * ) Notice: Subject to any disclaimer, the term of this patent is extended or adjusted under 35 U.S.C. 154(b) by 251 days.

(21) Appl. No.: 17/112,086

(22) Filed: Dec. 4, 2020

Related U.S. Application Data

(60) Provisional application No. 62/944,433, filed on Dec. 6, 2019.

(51) Int. Cl.
  *B07B 13/07* (2006.01)
  *B65G 27/08* (2006.01)
  *B65G 27/04* (2006.01)

(52) U.S. Cl.
  CPC .............. *B07B 13/07* (2013.01); *B65G 27/04* (2013.01); *B65G 27/08* (2013.01)

(58) Field of Classification Search
  CPC .......... B07B 13/07; B65G 27/04; B65G 27/08
  USPC ........................................................ 209/659
  See application file for complete search history.

(56) References Cited

U.S. PATENT DOCUMENTS

| | | | | |
|---|---|---|---|---|
| 1,664,496 A | * | 4/1928 | Reticus | F23H 17/12 126/180 |
| 2,341,790 A | * | 2/1944 | Kacena | F23H 9/08 126/169 |
| 3,231,088 A | * | 1/1966 | Grasse | B22D 29/005 209/342 |
| 5,292,006 A | * | 3/1994 | Girts, Jr. | B07B 1/46 209/242 |
| 6,065,606 A | * | 5/2000 | Bonner | B07B 13/16 209/325 |
| 2010/0064641 A1 | * | 3/2010 | Cullen | A01F 25/183 141/71 |

\* cited by examiner

*Primary Examiner* — Terrell H Matthews
(74) *Attorney, Agent, or Firm* — Woods Oviatt Gilman LLP; Dennis B. Danella, Esq.

(57) ABSTRACT

An attachment for a shaker conveyor for sorting material having various sizes. The attachment includes a passageway bordered on opposite sides by a pair of walls. A first grate is disposed in the passageway. The first grate defines a first gap for sorting the material. The first grate borders a first compartment having a first outlet. A second grate is disposed in the passageway. The second grate defines a second gap having a dimension different than the first gap. The second grate borders a second compartment separate from the first compartment and leading to a second outlet.

18 Claims, 5 Drawing Sheets

US 11,534,800 B1

ATTACHMENT FOR USE WITH LINEAR SHAKER TYPE CONVEYOR

CROSS-REFERENCE TO RELATED APPLICATION

The present application claims priority benefit of U.S. Provisional Patent Application No. 62/944,433 filed on Dec. 6, 2019, and entitled "Attachment for Use with Linear Shaker Type Conveyor," which is incorporated herein by reference.

TECHNICAL FIELD

The present invention relates generally to the field of conveying and separating equipment, and more particularly to an attachment for use with a linear shaker type conveyor.

BACKGROUND ART

Linear shaker conveyors are used to convey materials in a straight path without the need for conveyor belts. The advantages include less maintenance and less power requirements over belt type conveyors. There is a need for an attachment for a linear conveyor for separating different sized buds harvested from hemp or marijuana plants.

BRIEF SUMMARY OF THE INVENTION

With parenthetical reference to the corresponding parts, portions or surfaces of the disclosed embodiment, merely for the purposes of illustration and not by way of limitation, the present invention provides an attachment (22) for a shaker conveyor (10) for sorting material having various sizes. The attachment (22) comprises a support surface (31) bordered on opposite sides by a pair of walls (40,43). A first grate (46) is disposed on the support surface (31). The first grate (46) defines a first gap for sorting the material. The first grate (46) borders a first compartment (64) having a first outlet (25). A second grate (49) is disposed on the support surface (31). The second grate (49) defines a second gap having a dimension different than the first gap. The second grate (49) borders a second compartment (76) separate from the first compartment (64) and leading to a second outlet (79).

DESCRIPTION OF THE PREFERRED EMBODIMENTS

Figure 1:
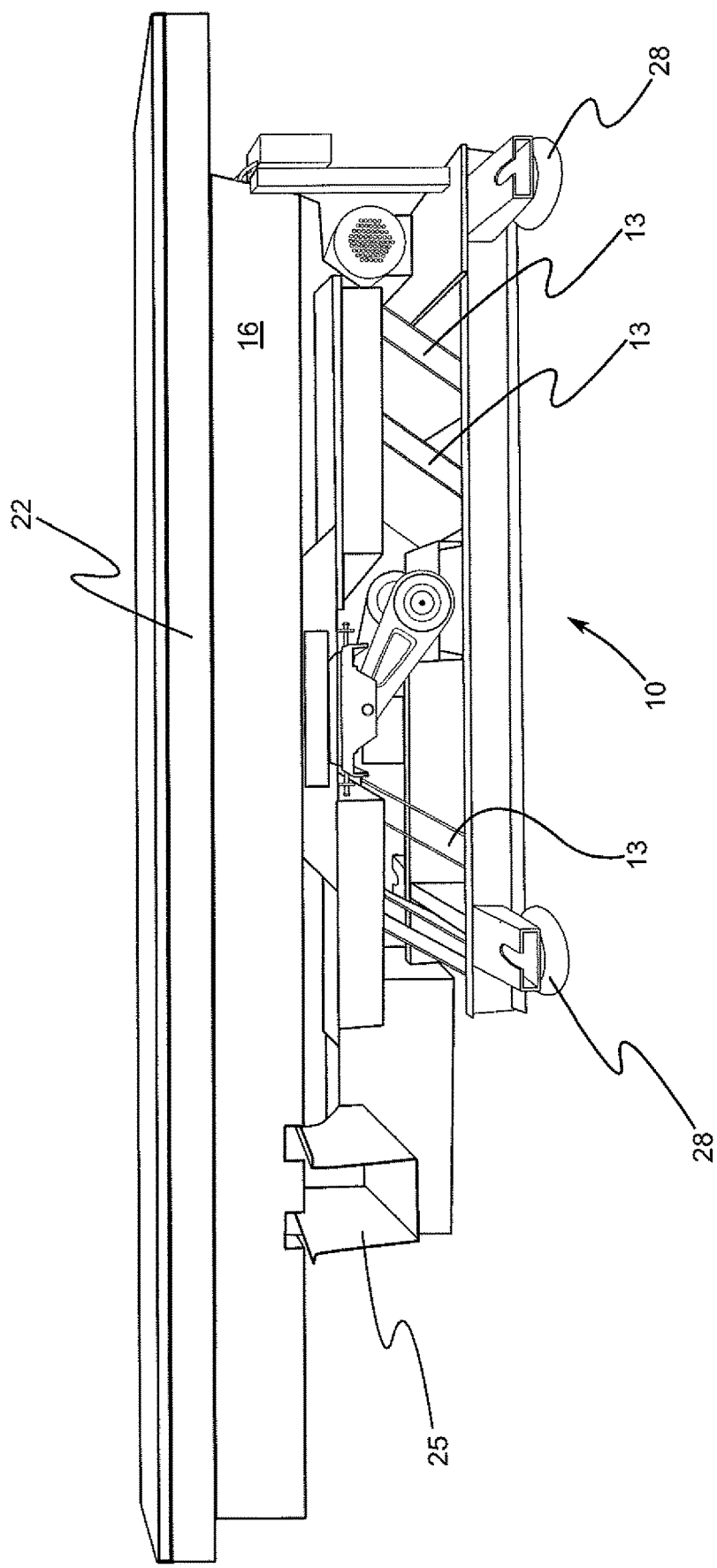
FIG. 1 is a side perspective view of one embodiment of the conveying and separating system of the present invention.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, debris, etc.) together with the specification, and are to be considered a portion of the entire written description of this invention. As used in the following description, the terms "horizontal", "vertical", "left", "right", "up" and "down", as well as adjectival and adverbial derivatives thereof, (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or of rotation, as appropriate.

Referring now to the drawings, and more particularly to FIG. 1 thereof, a shaker type linear conveyor 10 includes rocker arms 13 that move back and forth to cause a resulting reciprocating motion in a support frame 16. The reciprocating motion causes a product resting on the top surface to move from right to left with respect to the orientation of the figure. The movement is powered by an electric motor 19.

Figure 2:
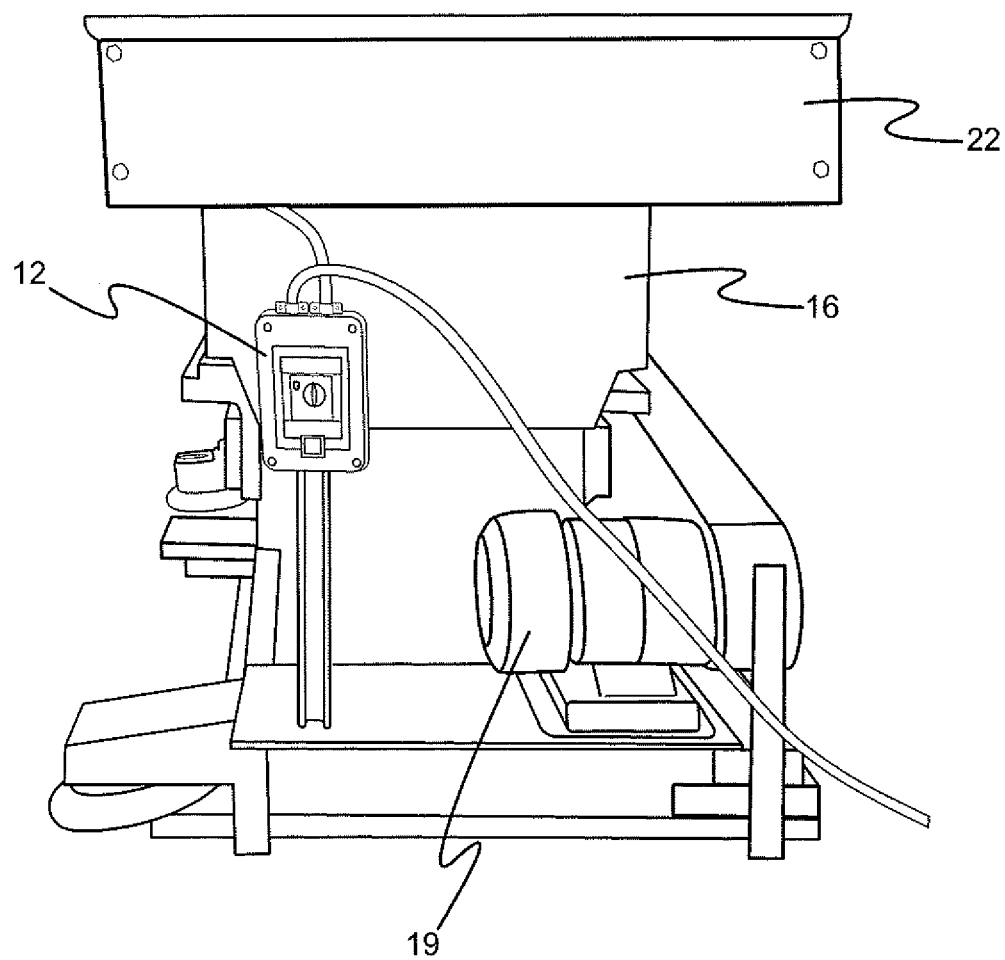
FIG. 2 is an end view of the system of the present invention.

An elongate attachment 22 is mounted on the frame 16. A chute 25 is configured to direct a portion of the product out of the attachment to a catch bin (not shown). The conveyor 10 is supported by feet 28 that engage with the floor. As shown in FIG. 2, the conveyor 10 is provided with a control panel 12 for starting and stopping the machine and for controlling the motor 19. The shaker type conveyor has several advantages over conveyors having sprockets, belts and the like. The construction of the conveyor is simpler, easier and less expensive to maintain than belt-type conveyors.

Figure 3:
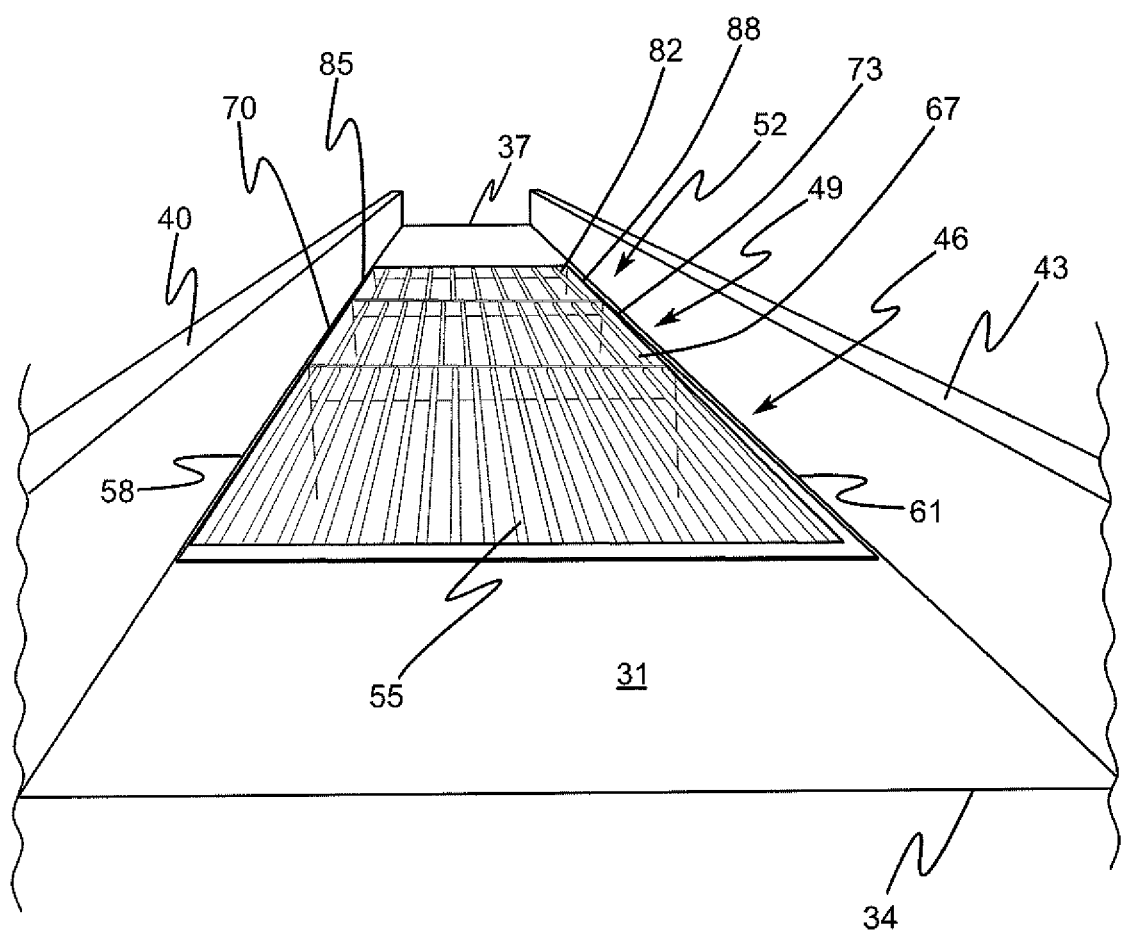
FIG. 3 is a partial perspective downstream view of the top surface of the attachment of the system.
Figure 4:
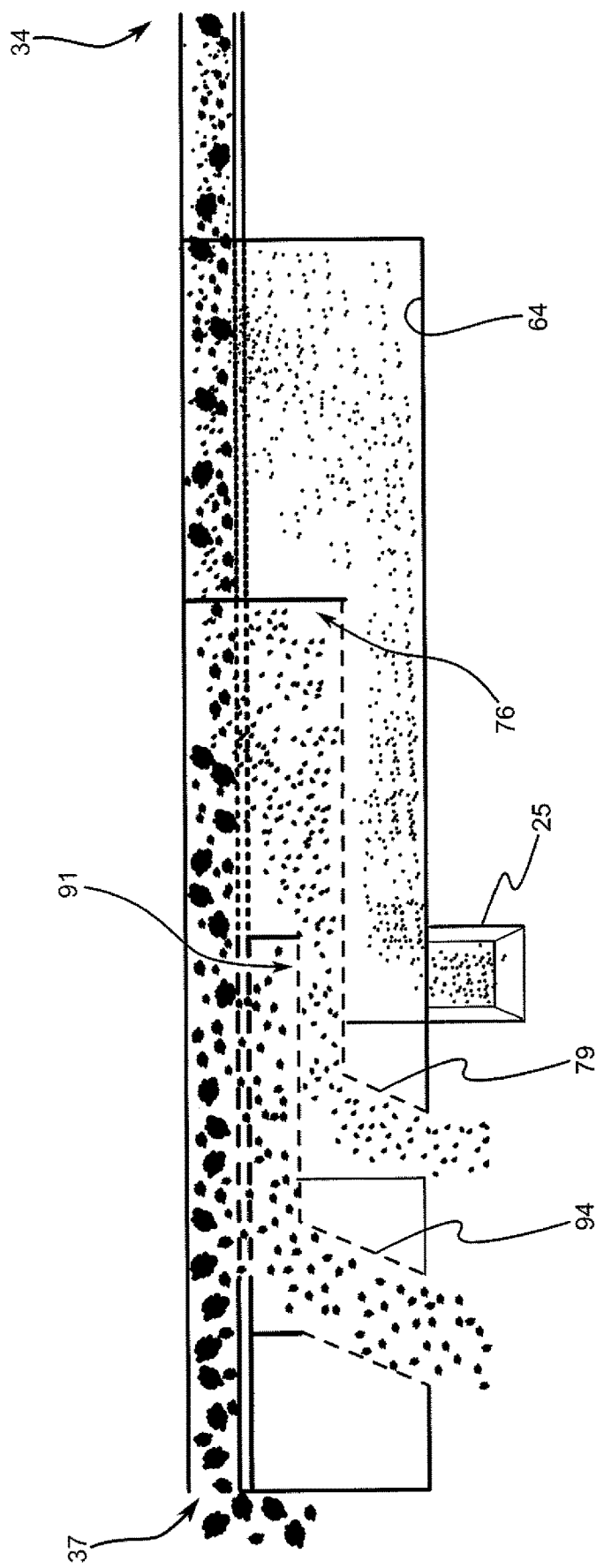
FIG. 4 is a side schematic view showing the configuration of the system of FIG. 1.

Turning to FIGS. 3-4, a downstream view of the inside of the attachment 22 is shown in FIG. 3. The attachment 22 includes an upper horizontal surface 31 that extends in the longitudinal direction from a first end 34 to a second end 37. A pair of vertical side walls 40 and 43 also extend in the longitudinal direction.

In the longitudinal direction, a series of grates 46, 49, and 52 are shown. The first grate 46 has a plurality of cylindrical bars 55 extending in the longitudinal direction. Bars 55 have a first diameter and are disposed in spaced apart relation from a first side 58 to a second side 61. The bars 55 have a diameter and a spacing between successive bars that provides for sorting smaller size buds. As the shaker conveyor 10 oscillates causing the product to move from the first end 34 to the second end 37, the first grate 46 causes smaller buds to fall through the spaces between the cylindrical bars 55 into a first compartment 64 (FIG. 4) disposed underneath the upper horizontal surface 31. The compartment 64 extends in the longitudinal downstream direction for a predetermined length. The end of the compartment 64 directs the buds to the chute 25 (shown in FIG. 1) that extends from the front of the machine in a direction approximately perpendicular to the longitudinal direction.

The second grate 49 has a plurality of cylindrical bars 67 extending in the longitudinal direction. Bars 67 have a first diameter and are disposed in spaced apart relation from a first side 70 to a second side 73. The bars 67 have a diameter and a spacing between successive bars that provides for sorting medium size buds. As the shaker conveyor 10 oscillates causing the product to move from the first end 34 to the second end 37, the second grate 49 causes medium size buds to fall through the spaces between the cylindrical bars 67 into a second compartment 76 disposed underneath the upper horizontal surface 31. The compartment 76 is separate from and positioned above the compartment 64.

The compartment 76 extends in the longitudinal downstream direction for a predetermined length. The end of the compartment 76 has an angled section 79 that directs the buds to fall into a space below the attachment where they can be received by a bin (best shown in FIG. 4).

The third grate 52 has a plurality of cylindrical bars 82 extending in the longitudinal direction. Bars 82 have a first diameter and are disposed in spaced apart relation from a first side 85 to a second side 88. The bars 82 have a diameter and a spacing between successive bars that provides for sorting larger size buds. As the shaker conveyor 10 oscillates causing the product to move from the first end 34 to the second end 37, the third grate 52 causes larger size buds to fall through the spaces between the cylindrical bars 82 into a third compartment 91 disposed underneath the upper horizontal surface 31. The compartment 91 is separate from and positioned above the first and second compartments 64, 76. The compartment 91 extends in the longitudinal downstream direction for a predetermined length. The end of the compartment 91 has an angled section 94 that directs the buds to fall into a space below the attachment where they can be received by a bin (best shown in FIG. 4).

The remaining buds that are too large to fit between any of the cylindrical bars are conveyed off of the end 37 of the attachment into another receptacle.

Figure 5:
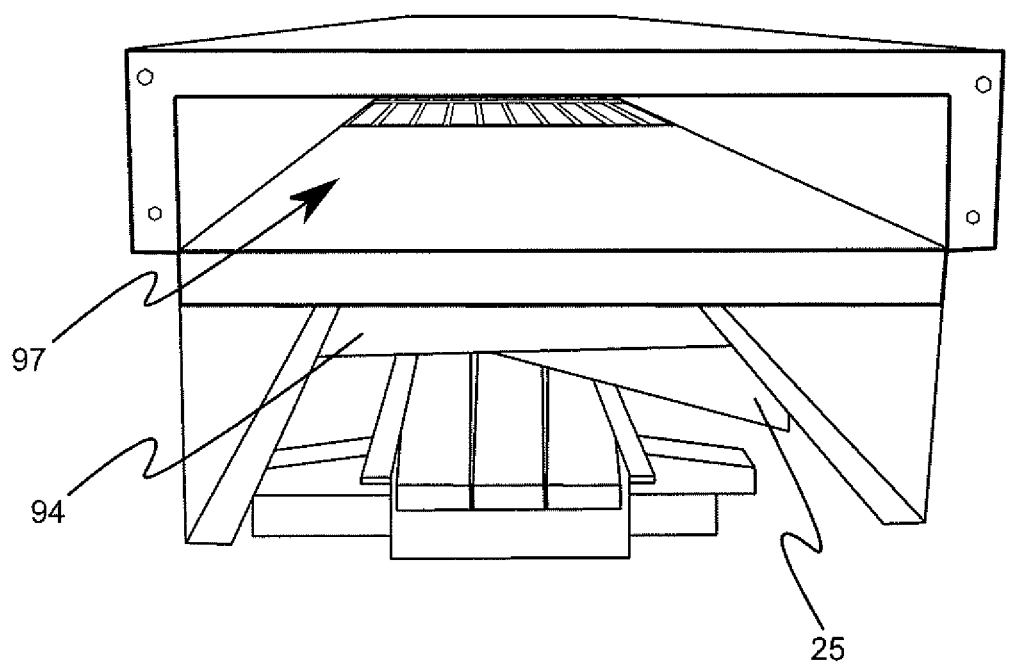
FIG. 5 is another perspective end view of the system of the present invention.

Turning to FIG. 5, the end of the attachment has an opening 97 where surface 31 terminates. The chute 25 is shown extending to the right of the figure. The angled section 94 is shown where compartment 91 terminates.

The present invention contemplates that many changes and modifications may be made. Therefore, while the presently-preferred form of the attachment has been shown and described, and several modifications and alternatives discussed, persons skilled in this art will readily appreciate that various additional changes and modifications may be made without departing from the spirit of the invention, as defined and differentiated by the following claims.

The invention claimed is:

1. An attachment for a shaker conveyor for sorting a material having various sizes, the attachment comprising:
    a passageway defined on top of the shaker conveyor, the passageway bordered on opposite sides by a pair of walls;
    a first grate disposed in the passageway, the first grate having a first plurality of parallel bars disposed in spaced apart relation, the first plurality of parallel bars having a first diameter, the first plurality of parallel bars defining a first gap configured for sorting the material, the first grate disposed above a first compartment leading to a first outlet; and,
    a second grate disposed in the passageway, the second grate having a second plurality of parallel bars disposed in spaced apart relation, the second plurality of parallel bars having a second diameter, the second plurality of parallel bars defining a second gap configured for sorting the material, the second gap being larger than the first gap, the second grate disposed above a second compartment separate from the first compartment and leading to a second outlet.

2. The attachment of claim 1, wherein the first diameter and the second diameter are equal.

3. The attachment of claim 1, wherein the second diameter is greater than the first diameter.

4. The attachment of claim 1, further comprising a first solid support surface disposed at a first end of the passageway.

5. The attachment of claim 4, further comprising a second solid support surface disposed at a second end of the passageway.

6. The attachment of claim 1, wherein the first compartment has a bottom wall disposed below a bottom wall of the second compartment.

7. The attachment of claim 1, further comprising a third grate disposed in the passageway, the third grate having a third plurality of parallel bars disposed in spaced apart relation, the third plurality of parallel bars having a third diameter, the third plurality of parallel bars defining a third gap configured for sorting the material, the third gap being larger than the second gap, the third grate disposed above a third compartment separate from the first and second compartments and leading to a third outlet.

8. An attachment for a shaker conveyor for sorting a material having various sizes, the attachment comprising:
    a passageway defined on top of the shaker conveyor, the passageway bordered on opposite sides by a pair of walls;
    a first grate disposed in the passageway, the first grate having a first plurality of parallel bars disposed in spaced apart relation, the first plurality of parallel bars having a first diameter, the first plurality of parallel bars defining a first gap configured for sorting the material, the first grate disposed above a first compartment leading to a first outlet; and,
    a second grate disposed in the passageway, the second grate having a second plurality of parallel bars disposed in spaced apart relation, the second plurality of parallel bars having a second diameter, the second plurality of parallel bars defining a second gap configured for sorting the material, the second gap being larger than the first gap, the second grate disposed above a second compartment separate from the first compartment and leading to a second outlet;
    a third grate disposed in the passageway, the third grate having a third plurality of parallel bars disposed in spaced apart relation, the third plurality of parallel bars having a third diameter, the third plurality of parallel bars defining a third gap configured for sorting the material, the third gap being larger than the second gap, the third grate disposed above a third compartment separate from the first and second compartments and leading to a third outlet.

9. The attachment of claim 8, further comprising a first solid support surface disposed at a first end of the passageway.

10. The attachment of claim 9, further comprising a second solid support surface disposed at a second end of the passageway.

11. The attachment of claim 8, wherein the first compartment has a bottom wall disposed below a bottom wall of the second compartment.

12. A method for sorting a material having various sizes, the method comprising:
    providing a shaker conveyor with rocker arms that cause a reciprocating motion for an attachment disposed on top of the shaker conveyor;
    providing the attachment with a passageway bordered on opposite sides by a pair of walls;
    providing a first grate disposed in the passageway, the first grate having a first plurality of parallel bars disposed in spaced apart relation, the first plurality of parallel bars having a first diameter, the first plurality of parallel bars defining a first gap configured for sorting the material, the first grate disposed above a first compartment leading to a first outlet; and, providing a second grate disposed in the passageway, the second grate having a second plurality of parallel bars disposed in spaced apart relation, the second plurality of parallel bars having a second diameter, the second plurality of parallel bars defining a second gap configured for sorting the material, the second gap being larger than the first gap, the second grate disposed above a second compartment separate from the first compartment and leading to a second outlet; and, placing the material in the passageway and activating the shaker conveyor such that the materials is conveyed along the pathway from a first end to a second end and across the first and second grate.

13. The method of claim 12, wherein the first diameter and the second diameter are equal.

14. The method of claim 12, wherein the second diameter is greater than the first diameter.

15. The method of claim 12, further comprising providing a first solid support surface disposed at a first end of the passageway.

16. The method of claim 15, further comprising providing a second solid support surface disposed at a second end of the passageway.

17. The method of claim 12, wherein the first compartment has a bottom wall disposed below a bottom wall of the second compartment.

18. The method of claim 12, further comprising providing a third grate disposed in the passageway, the third grate having a third plurality of parallel bars disposed in spaced apart relation, the third plurality of parallel bars having a third diameter, the third plurality of parallel bars defining a third gap configured for sorting the material, the third gap being larger than the second gap, the third grate disposed above a third compartment separate from the first and second compartments and leading to a third outlet.

* * * * *